US010097542B2

United States Patent
Woodward et al.

(10) Patent No.: US 10,097,542 B2
(45) Date of Patent: Oct. 9, 2018

(54) MOBILE USER INTERFACE SYSTEM AND METHODS THEREFOR

(71) Applicant: ELBIT SYSTEMS OF AMERICA, LLC, Fort Worth, TX (US)

(72) Inventors: Robert A. Woodward, Forth Worth, TX (US); Daniel M. Herring, Fort Worth, TX (US); Andrew W. Hull, Grapevine, TX (US)

(73) Assignee: Elbit Systems of America, LLC, Fort Worth, TX (US)

( * ) Notice: Subject to any disclaimer, the term of this patent is extended or adjusted under 35 U.S.C. 154(b) by 284 days.

(21) Appl. No.: 14/579,705

(22) Filed: Dec. 22, 2014

(65) Prior Publication Data

US 2016/0182501 A1    Jun. 23, 2016

(51) Int. Cl.
| | | |
|---|---|---|
| *G06F 21/78* | (2013.01) | |
| *H04L 29/06* | (2006.01) | |
| *G06K 9/00* | (2006.01) | |
| *G06F 12/14* | (2006.01) | |
| *G06T 1/20* | (2006.01) | |

(52) U.S. Cl.
CPC ...... *H04L 63/0861* (2013.01); *G06F 12/1408* (2013.01); *G06F 21/78* (2013.01); *G06K 9/00087* (2013.01); *G06K 9/00617* (2013.01); *G06T 1/20* (2013.01); *H04L 63/0435* (2013.01)

(58) Field of Classification Search
CPC .......... G06F 21/32; G06F 21/70; G06F 21/72; G06F 21/78; H04L 63/0861
See application file for complete search history.

(56) References Cited

U.S. PATENT DOCUMENTS

| | | | |
|---|---|---|---|
| 6,839,792 | B2 | 1/2005 | Feldstein et al. |
| 7,167,945 | B2 | 1/2007 | Feldstein et al. |
| 7,293,128 | B2 | 11/2007 | Feldstein et al. |
| 7,296,165 | B2 | 11/2007 | Feldstein et al. |
| 8,904,556 | B1 * | 12/2014 | Bertram .................. G06F 21/84 380/200 |

(Continued)

FOREIGN PATENT DOCUMENTS

| | | |
|---|---|---|
| EP | 2808204 | 12/2014 |
| WO | 2013-103519 | 11/2013 |

OTHER PUBLICATIONS

PCI-Express AceXtreme(r) Data Sheet, Model BU-67302B0C0L-202, Data Device Corporation, 2012, (62 pages).

(Continued)

*Primary Examiner* — David J Pearson
(74) *Attorney, Agent, or Firm* — Conley Rose, PC

(57) ABSTRACT

A system. At least some embodiments are a system including a first processor and a non-volatile random access memory coupled to the first processor, the non-volatile random access memory storing program instructions for execution by the first processor in which the programming instructions are stored only in encrypted form. The system further includes an encryption engine coupled to the first processor and coupled to the non-volatile random access memory. A bridge logic device coupled is to the processor and configured to couple to an external peripheral network bus. The encryption engine is configured to decrypt software program instructions stored in the non-volatile random access memory for execution by the first processor.

12 Claims, 5 Drawing Sheets

(56) References Cited

U.S. PATENT DOCUMENTS

| | | | |
|---|---|---|---|
| 2002/0169960 A1* | 11/2002 | Iguchi | G06F 21/10 713/174 |
| 2006/0230217 A1 | 10/2006 | Moll | |
| 2008/0240134 A1 | 10/2008 | Gregg | |
| 2009/0022317 A1 | 1/2009 | Akima et al. | |
| 2011/0112969 A1 | 5/2011 | Zaid et al. | |
| 2012/0180507 A1* | 7/2012 | Leebow | G06F 1/1632 62/129 |
| 2012/0303177 A1 | 11/2012 | Jauch et al. | |
| 2013/0179722 A1 | 7/2013 | Smith et al. | |
| 2013/0227193 A1 | 8/2013 | Kumar | |
| 2014/0195108 A1 | 7/2014 | Schumacher | |

OTHER PUBLICATIONS

PCI Express System Architecture, Chapter 3, Address Spaces & Transaction Routing, Aug. 5, 2003, pp. 105-152.

PLX Technology and Avago Technologies, A Demonstration of PCI Express Generation 3 over a Fiber Optical Link, White Paper, Nov. 15, 2011, 9 pages.

Dolphin Interconnect Solutions, Dolphin Express IX Reflective Memory/Multicast, Whitepaper, Jun. 19, 2013, 8 pages.

Integrated Device Technology, PCI Express(r) Solutions, Product Overview, Aug. 14, 2014, 4 pages.

Budruk, Ravi et al., PCI Express System Architecture, MindShare, Inc., 2003, 222 pages.

PLX Technology, Product Brief, PEX 8717, PCI Express Gen 3 Switch, 16 Lanes, 10 Ports, Aug. 1, 2011, 5 pages.

Conley, Reginald, PCIe Goes 'Clock-less', PLX Technology, Independent SSC Operation without SSC Clock Isolation, White Paper, May 11, 2012, 9 pages.

PLX Technology, Product Brief, PEX8714, PCI Express Gen3 Switch, 12 Lanes, 5 Ports, Sep. 10, 2012, 4 pages.

PCT Application No. PCT/US2015/064730 International Search Report and Written Opinion, dated Apr. 12, 2016.

* cited by examiner

MOBILE USER INTERFACE SYSTEM AND METHODS THEREFOR

CROSS-REFERENCE TO RELATED APPLICATIONS

None.

TECHNICAL FIELD

The present invention relates to user interfaces in vehicular systems and in particular to mobile devices applied thereto.

BACKGROUND

Modern vehicular systems employed in industrial or military applications rely on onboard computer-based data processing systems for instrumentation, control functions, data collection and interactions with a human operator, including control inputs and instrumentation and data display. Additionally, the onboard system may receive data pertaining to a particular mission as operator-supplied input. The latter typically makes use of specialized mission data cartridges that contain the data uploaded from a mission planning station. The cartridge is then coupled to the vehicle computer system and the mission data loaded into the system. As vehicles with the capability to operate both autonomously and under human control are introduced, the hardware to support both modes of operation adds to the cost of such vehicles. Additionally, each platform may require a customized set of control inputs/outputs (I/O), instrumentation displays and the like. Consequently, there is a need in the art to provide systems and methods to reduce the complexity of the user interface in vehicular platforms and to automate the customization thereof across vehicular platforms.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
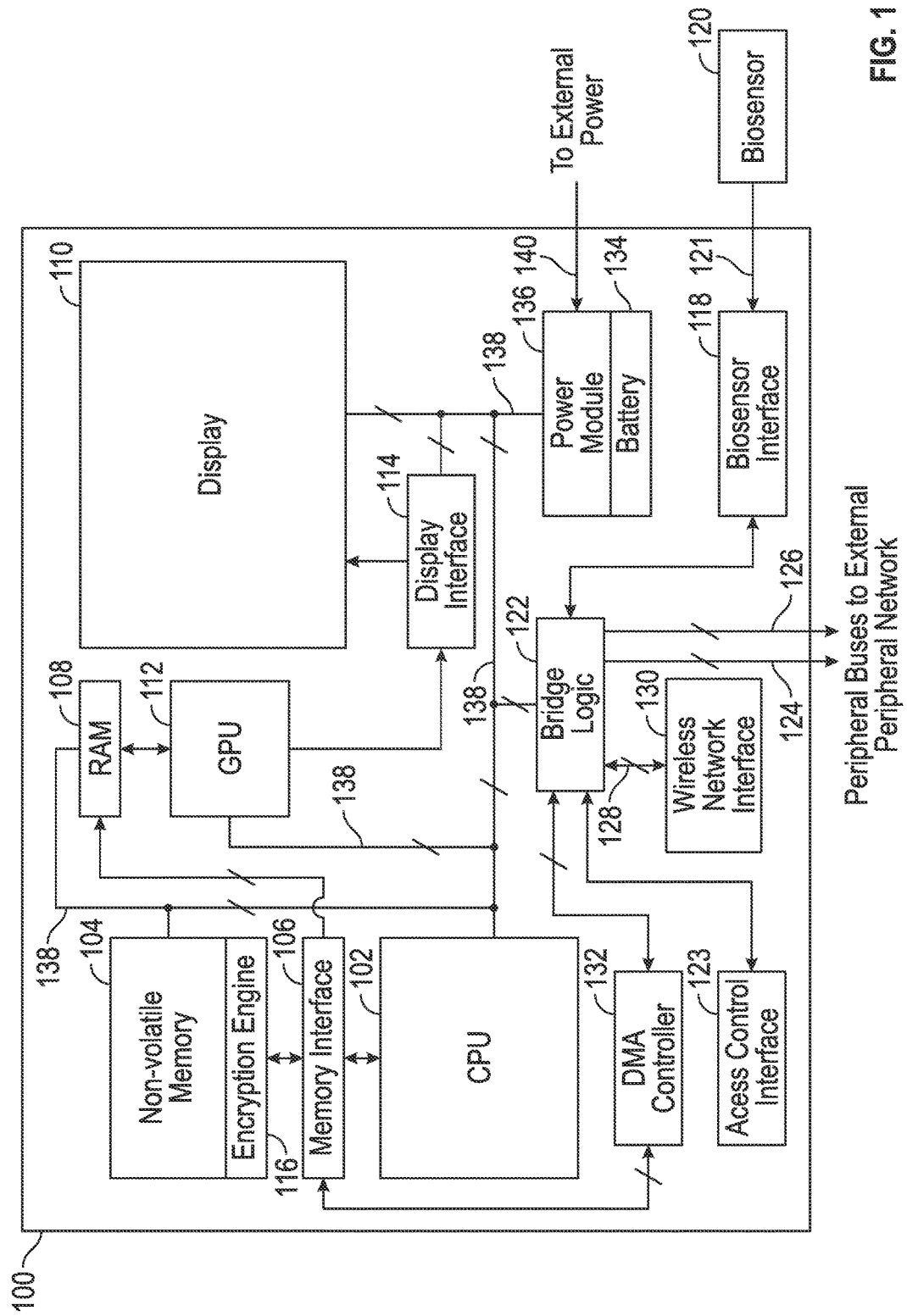
FIG. 1 shows a block diagram of a mobile user interface system in accordance with at least some embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

"Autonomously" means without human control.

"Autonomous vehicle" means a vehicle capable of operation autonomously over at least a portion of its operating envelope. For the avoidance of doubt, an autonomous vehicle includes a vehicle that may, in at least some configurations and/or portions of its operating envelope, be operated by a human operator.

"Access control data" means data associated with a user against which data input by a user is authenticated to permit access to a system or device. Examples include a user identifier and/or password, a biosensor signature, or the like.

"Biosensor signature" means a digital representation of a physical characteristic associated with a user of a data processing system requiring authenticated access by the user, and by which such authentication may be effected. Exemplary biosensor signatures include a digital representation of the user's finger or thumb print, a digitized retinal scan, or voice print. For the avoidance of doubt, a fingerprint, as used herein shall include a thumbprint.

"Exemplary means "serving as an example, instance, or illustration." An embodiment described herein as "exemplary" is not necessarily to be construed as preferred or advantageous over other embodiments.

"Mission data" means information provided to a vehicle to adapt the vehicle to a particular mission for which the vehicle will be used. Exemplary mission data includes but is not limited to executable programs, configuration data, projected routes, stylistic settings, communication frequencies, encryption keys, weather data, and maps.

"Mission operations data" means information pertaining to a particular mission and generated during the course of the use of the vehicle.

"Mobile user interface system" means a computer system configured to serve as an interface between a user and a vehicle.

"Public key encryption system" means an encryption system in which a pair of keys that are unequal but mathematically related are used. One key of the pair (referred to as the public key) is used to encrypt the data and the second key of the pair (referred to as the private key) is used to recover the original, unencrypted, data from the encrypted data. A public key encryption system may also be referred to an asymmetric key encryption system.

"Vehicle" means an apparatus or device for conveying personnel, materials, good, equipment and the like whether on land, in the air, or at sea, including, but not limited to tracked and wheeled automotive systems, terrestrial hovercraft, aircraft, marine vessels including, for example, marine and amphibious hovercraft, ships and submersible vessels.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Refer now to FIG. 1 illustrating a mobile user interface system 100 in accordance with a least some embodiments of the principles of the disclosure. Mobile user interface system 100 may be used with a vehicle computer system which will be described below in conjunction with FIG. 2. A device embodying a system 100 may be mechanically configured in a laptop or tablet personal computer (PC) form factor. Mobile user interface system 100 includes a processor (CPU) 102 coupled to non-volatile random access memory (NVRAM) 104 via a memory interface 106. NVRAM 104 may store programming instructions and data. In particular, the programming instructions stored in NVRAM 104 may include instructions that are executed on CPU 102. Also, programming instructions to be executed on the vehicle computer system via a download to the vehicle system, as described further below, may be stored as data in NVRAM 104. Data stored in NVRAM may also include data that is used by the vehicle computer system in the course of a particular mission.

Software stored in NVRAM for execution by the local CPU, CPU 102 may be lightweight software for performing the data management and interface operations of system 100 as described further below. By way of example, in at least some embodiments, software stored in NVRAM 104 may include program instructions for implementing an ARINC 661 display system and a Future Airborne Capability Environment (FACE) common operating environment. ARINC 661 is an aviation-industry cockpit display system standard promulgated by ARINC Industry Activities (ARINC-IA). ARINC-IA is a program of SAE Industry Technologoes Consortia (SAE ITC), Warrendale, Pa. FACE is a set of aviation-industry standards to promote software interoperability, portability and security across aviation platforms promulgated by the FACE Consortium, a member organization of The Open Group, San Francisco, Calif. and Burlington, Mass. CPU 102 may be coupled to NVRAM 104 via a memory interface 106 which manages reads from and writes to NVRAM 104. Further memory interface 104 may provide direct memory access (DMA) to NVRAM 104 as described further below.

Memory interface 106 may also be coupled to RAM 108. RAM 108 may be, for example, dynamic ram which may store data to be displayed on display 110. In at least some embodiments of system 100, a graphics processor (GPU) 112 may be used to render graphics to be displayed, thereby reducing the workload on CPU 102. GPU 112 may comprise logic for implementing a graphics rendering application program interface (API) such as OpenGL. OpenGL is an API for rendering 2D and 3D vector graphics promulgated by the Kronos Group, Beaverton, Oreg. GPU 112 may be coupled to display 110 by a display interface 114. For example, in an embodiment in which display 110 comprises a liquid crystal display (LCD) technology, display interface 114 may include an LCD controller. In an embodiment of a mobile user interface system without a GPU, CPU 102 may be coupled to display interface 114 and display information generated by software executed on CPU 102. Although a single display is shown in FIG. 1, in at least some embodiments multiple displays may be included.

In at least some embodiments, data and software program instructions may be stored in NVRAM 104 in encrypted form. Encryption engine 116 may then provide, for example, decryption services to provide decrypted instructions to CPU 102 for execution. Encryption engine 116 may employ a public key encryption system in whereby program instructions may be encrypted using a public key associated with a particular system 100 by an external system and uploaded to the particular system 100, as described further below in conjunction with FIG. 2. The encrypted instructions, when fetched by CPU 102 for execution, are decrypted by encryption engine 116 using the private key associated with the particular system. The private key may be stored in the hardware of encryption engine 116, by, for example, fusing the key into the encryption engine at the time of manufacture. Because the public key need not be secured, it can be delivered to say a mission planning system by any suitable method and associated with a particular mobile user interface system using, for example, a serial number of the system.

A user-authorization mechanism may be embodied in a biosensor interface 118 which may connect system 100 to an external biosensor 120. As described further below in conjunction with FIG. 2, biosensor 120 may be included in a vehicle docking station configured to receive mobile user interface system 100 and provide electrical and mechanical couplings thereto. Exemplary embodiments of a biosensor 120 include a retinal scan device and a fingerprint scan device. Biosensor interface 118 may receive data from biosensor 120 on input 121 and communicate it via bridge logic 122 to CPU 102 for comparison with biosensor data associated with a particular user, which may be stored in NVRAM 104. Such biosensor data may be stored in encrypted form, similar to programming instructions, as described above. In such an embodiment, encryption engine 116 may decrypt the data prior to the data being loaded into CPU 102. Biosensor data associated with a particular user may be loaded into NVRAM in conjunction with other mission data as described further below in conjunction with FIG. 6. In this way, any device embodying mobile user interface system 100 may be associated with a given user at the time that user initiates a mission.

Other user-authorization mechanisms may also be used. An access control interface 123 coupled to bridge logic 122 may be used as an alternative to or in conjunction with biosensor interface 121 to limit access to system 100 to authorized users. For example, access control interface 123 may comprise a radio frequency identification (RFID) tag or card reader. In at least some embodiments, such an access control interface 123 may operate in conjunction with the Common Access Card issued by the U.S. Government. Access control may also be by username and password entered on a keyboard coupled to a docking station that connected to system 100 as described further below in conjunction with FIG. 2.

Bridge logic 122 also provides an interface to one or more peripheral buses, such as buses 124, 126 and 128. Peripheral buses 124-128 may be used for data communication between system 100 and external devices. In other words, peripheral bus 124 may provide a communication network link between mobile user interface system 100 and a peripheral network bus coupled, via an external data communication network, to external devices or systems, exemplary embodiments of which are described further below in conjunction with FIGS. 2 and 3. Peripheral bus 128 is shown coupled to a wireless network interface 130. Wireless network interface provides an interconnection of system 100 with a wireless network, such as an industry-standard IEEE 802.11 network. Exemplary embodiments of peripheral buses 124, 126 and 128 include a Peripheral Component Interface Express (PCIe) bus promulgated by the PCI-SIG, Beaverton, Oreg., and a Universal Serial Bus (USB) promulgated by the USB Implementers Forum (USB-IF), Portland, Oreg. In at least some embodiments, bridge logic 122 may be coupled to memory interface 106 via a DMA controller 132, thereby effecting access to NVRAM 104 without the involvement of CPU 102. In some embodiments, DMA controller 132 may be incorporated within bridge logic 122. Further, encryption engine 116 may be configured to bypass DMA reads so that encrypted data stored in NVRAM 104 cannot be retrieved in unencrypted form.

Power for mobile user interface system 100 may be obtained from an internal battery 134. Power module 136 conditions the battery power and performs any voltage level shifting as may be required by the various devices in system 100. Power is supplied to the devices via power bus 138 which may be a multi-conductor bus based on the power requirements of the various devices. Power may also be provided from an external source power connection 140 that, for example, may couple to a vehicle primary electrical power source. Further, power module 136 may include circuitry for charging battery 134 when connected to the vehicle primary power source.

Figure 2:
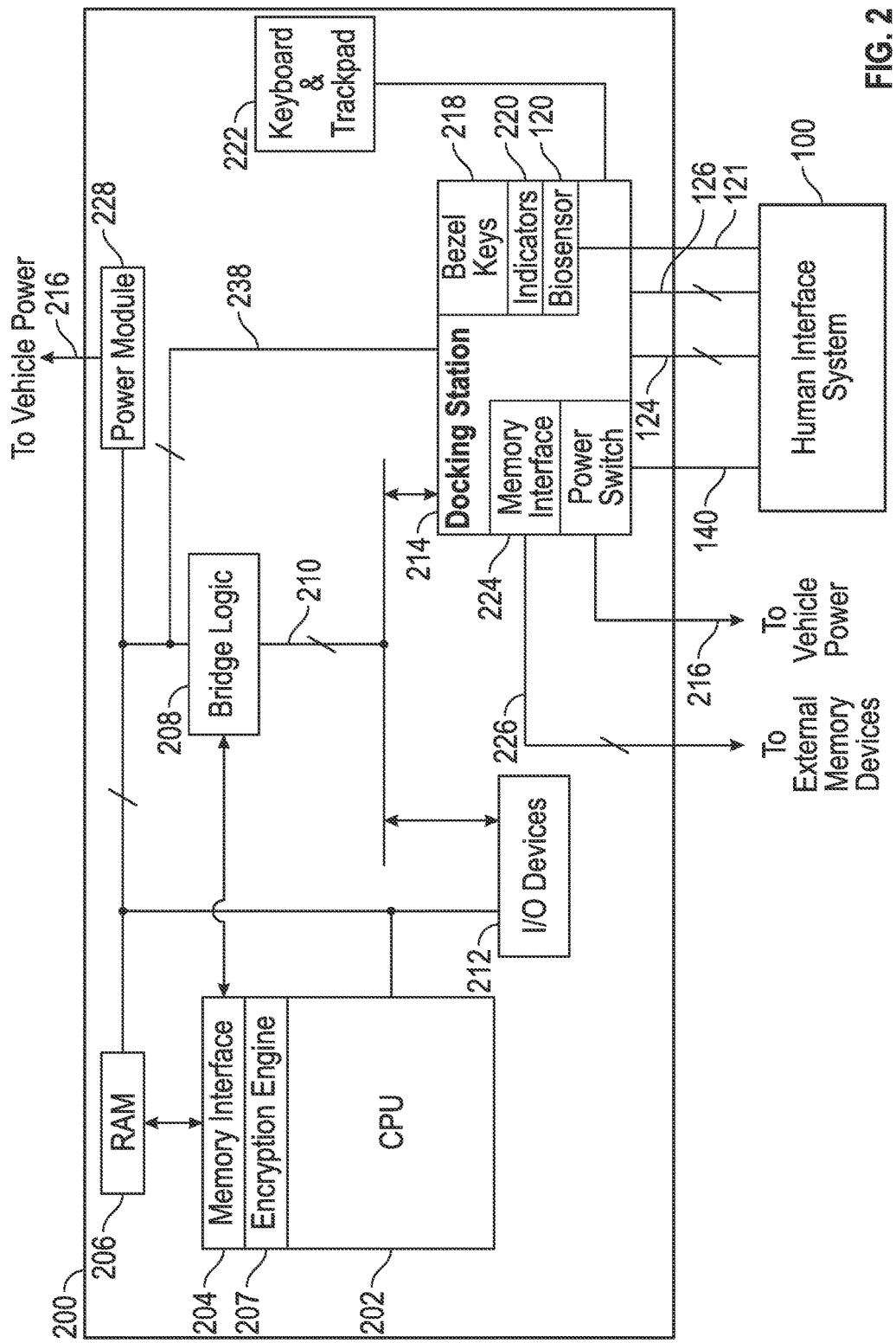
FIG. 2 shows a block diagram of a vehicle computer system in accordance with at least some embodiments.

To further appreciate the mobile user interface system 100, refer now to FIG. 2 illustrating, in a high-level block diagram, a vehicle computer system 200 in accordance with at least some embodiments. Vehicle computer system 200 includes at least one processor (CPU) 202. A memory interface 204, which may, in some embodiments, be integrated with CPU 202, couples CPU 202 to RAM 206. In at least some embodiments, a portion of RAM 206 may comprise non-volatile storage. RAM 206 may store software application program instructions for execution by CPU 202 as well as data for use by the software applications or other devices in the vehicle in which the vehicle computer system 200 is deployed. In particular, RAM 206 may store mission related software applications and data as uploaded to vehicle computer system 200 from mobile user interface system 100 as described further below. For example, mission related software applications may include software to customize the instrumentation displayed to the user based on user preferences, mission requirements and the like. An encryption engine 207 may decrypt and/or encrypt data as described further below in conjunction with FIG. 3. Although encryption engine 207 is shown as incorporated in CPU 202, in at least some embodiments encryption engine 207 may be a separate hardware device and in still other embodiments may be implemented in software stored in a non-volatile portion of RAM 206.

Bridge logic 208 couples memory interface 204 to one or more peripheral buses 210. Peripheral buses 210 provide data communication links between memory interface 204, and peripheral devices such as input/output (I/O) devices 212 and docking station 214. Similar to buses 124-128, peripheral buses 210 may include, by way of example, industry-standard buses such as PCIe buses, and USB buses. However, computer system 200 is not limited to such buses and any suitable bus may be used. In this way, CPU 202 can send data to and receive data from the various peripheral devices. Bridge logic 208 may also provide DMA service to RAM 206 through DMA controller logic incorporated therein. Further, I/O devices 212 are not limited to user-oriented devices such as keyboard, printers, trackpads and the like, but may also include sensors and/or instrumentation electronics, vehicle automation controllers, digital and/or analog communication systems, controller area network devices and the like (which may collectively be referred to as "vehicle I/O sensors") that may be sending and receiving data to CPU 202 with respect to the state of electrical and mechanical systems onboard a vehicle in which system 200 is deployed. For a description of a peripheral bus system and associated I/O devices that may be used in conjunction with vehicle computer system 200, reference may be made to co-pending, commonly-owned U.S. patent application Ser. No. 14/567,143, titled "Ring-based Network Interconnect" which is incorporated by reference as if fully reproduced herein.

Docking station 214 may provide electrical connections to mobile user interface system 100. It may also include fixtures (not shown in FIG. 2) to secure mobile user interface system 100 to the vehicle in which vehicle computer system 200 is deployed, and to isolate the system from mechanical stresses that might otherwise be imposed during operation of the vehicle. Electrical connections may include power and data connections. Docking station 214 may be connected to the vehicle primary power bus 216 which may then connect the vehicle primary power to external source power connection 140. Docking station 214 may also include user-centric I/O devices such as bezel keys 218 and indicators 220, which may include tactile feedback to the user, emergency display of information, and the like. Docking station 214 may also provide for connections to other user I/O devices such a keyboard and trackpad 222 and similar pointing and data entry devices such as joysticks and hands-on-throttle and stick (HOTAS) controls. Biosensor 120 may also be included in docking station 214, as previously described. A memory interface 224 may provide a bus connection 226 to an external memory device such as a USB memory stick, CDROM reader, solid-state or mechanical hard drives, SD cards, CF cards, and the like.

A power module 228 connected to the vehicle primary power supply conditions the vehicle power and performs any voltage level shifting as may be required by the various devices in system 200, and supplies the devices via power bus 238 which may be a multi-conductor bus based on the power requirements of the various devices.

In at least some embodiments of a vehicle computer system, a native display device may not be included. For example, such embodiments may be deployed in autonomous vehicles in which a fixed display device is superfluous during autonomous operation and adds weight and cost to the vehicle. However, such embodiments without a fixed display device need not be limited to autonomous vehicles.

Figure 3A:
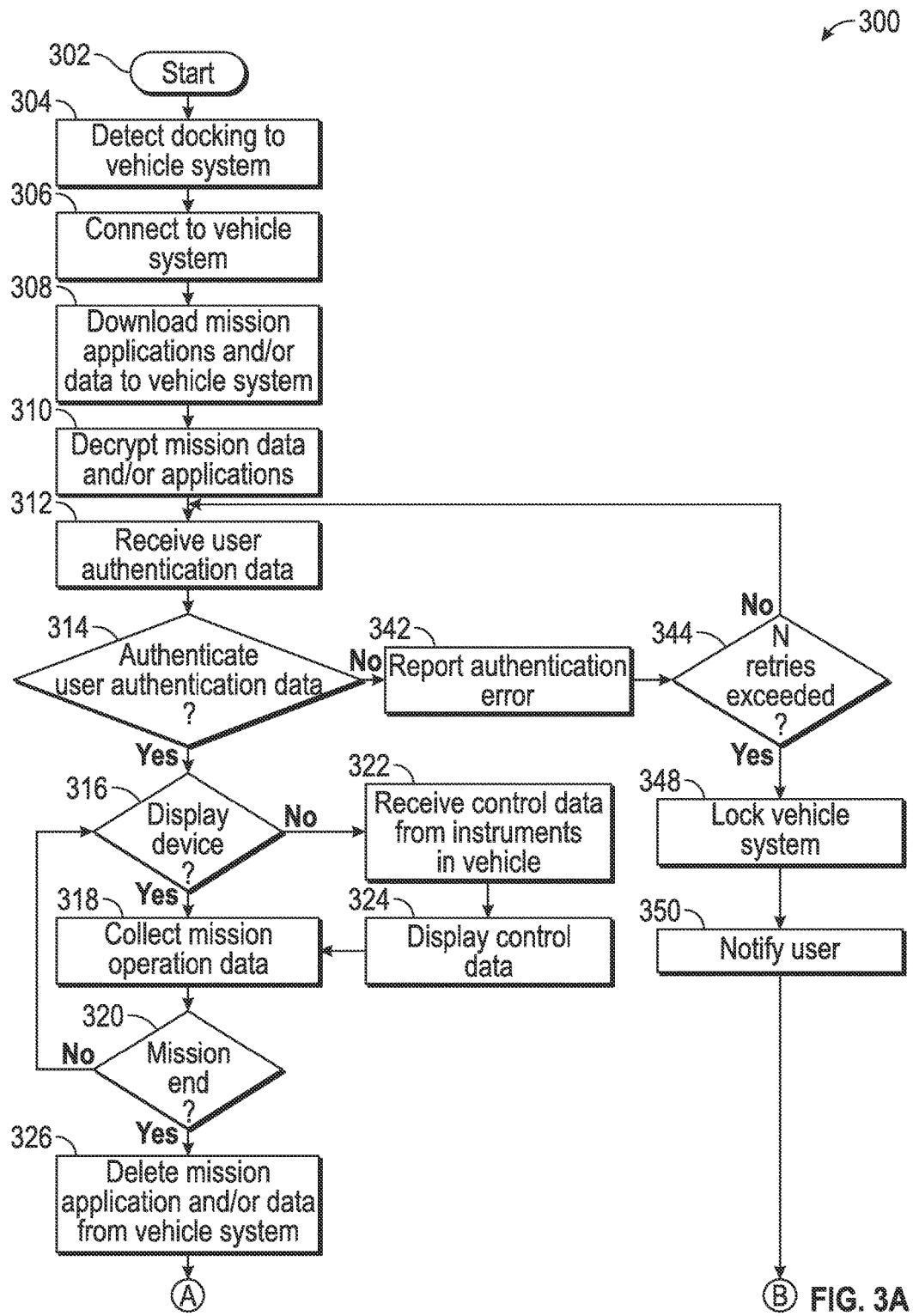
FIG. 3 (comprised of FIGS. 3A and 3B) shows a flow chart of a method for inter-operating a mobile user interface system and vehicle computer system in accordance with at least some embodiments
Figure 3B:
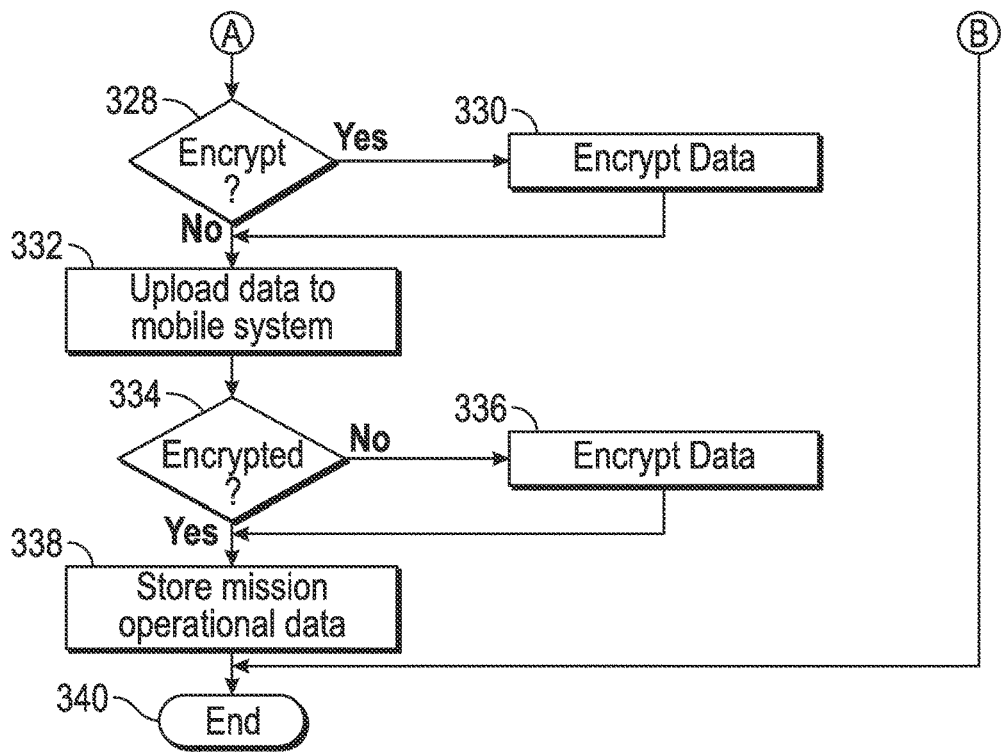

Turning now to FIG. 3, there is shown a flowchart of a method 300 for the inter-operation of a user interface system and a vehicle computer system as exemplified by mobile user interface system 100 and vehicle computer system 200, respectively. Method 300 begins at block 302. In block 304, a docking to the vehicle computer system is detected. Docking may be detected by a hot-plug in an embodiment in a PCIe or, alternatively a USB context. In other embodiments a switch in the docking station may be closed by insertion of the mobile user interface system into the docking station. Closing the switch may generate an interrupt and poll-able signal to the vehicle system. The foregoing are exemplary and any suitable mechanism to signal the docking to the vehicle system may be used. In block 306, the mobile user interface system is connected to the vehicle computer system via a vehicle data communication network, and registered on the vehicle network with its capabilities, such as an ARINC 661 display system, for example. For example, when the vehicle system detects the mobile interface on the vehicle system network, the mobile system may be polled for a list of capabilities it provides. For example, the mobile user interface system may maintain a public pointer in its address space on the vehicle system network, and, at that address, provide its capabilities. Such capabilities may include ARINC 661 display, mission data loader and mission data store capabilities. The vehicle system may then start software resident on the vehicle system based on these enumerated types. For example, the vehicle system may start a mission data loader application that downloads mission related data and/or application software from the mobile user interface system to the vehicle computer system, block 308. The data and application software may be stored in NVRAM in the mobile user interface system and may comprise data and applications that pertain to a particular operation or mission that the user is undertaking. Stated otherwise, the mobile user interface system provides a mechanism to configure the vehicle for a particular mission just prior to initiating an operation. Configuration of the vehicle may include, for example, the addition of mission-related hardware packages and at least a portion of the downloaded application software and/or data comprises software and/or data associated with such hardware packages.

Further, in operating environments in which security is important, the application software and data may be stored in the NVRAM of the mobile user interface system in encrypted form. In block 310 the data and/or application software are decrypted. An encryption engine in the vehicle computer system may decrypt the data and application software. In particular, the data and application software may be encrypted with a public key encryption system using a public encryption key associated with the particular vehicle. The encryption engine may use the associated private key to perform the decryption. The private key may be fused into the encryption engine at the time of manufacture thereby obviating the entry of the private key by manual methods that might be subject to compromise.

In block 312, user input authentication data, which may, for example, be biosensor scan data from a biosensor in the in the vehicle docking station or may be other user input authentication data such as a user identifier and password entered via a keyboard in or connected to the vehicle docking station, is received. The user input authentication data is authenticated in block 314. The access control data, such as a biosensor signature or user identifier and password, in at least some embodiments may be included in the mission data stored in mobile interface system NVRAM and downloaded at block 308. If the user input authentication data received in block 312 authenticates against the access control data, the biosensor signature for example, method 300 proceeds by the "Yes" branch of block 314 to block 316.

Turning now to block 316, if the vehicle includes a fixed display device, block 316 proceeds by the "Yes" branch and loops through block 318 until the mission ends, at block 320. In block 318, data mission operations data is collected for subsequent analysis, as described further below. At the end of the mission, method 300 breaks out of the loop via the "Yes" branch of block 320.

Returning to block 316, if the vehicle does not include a fixed display device, block 316 proceeds by the "No" branch to block 322. In block 322, control data is received from vehicle instrumentation via I/O devices in the vehicle computer system, as described above in conjunction with FIG. 2. Control data is displayed on a display device which may be in the mobile user interface system, for example display 110, FIG. 1, block 324. At least a portion of the control data displayed may be customized for the particular mission using software applications downloaded at block 308. Control data may, in at least some embodiments, conform to the ARINC 661 specification, and, accordingly, displayed under the control of software instructions stored in the NVRAM of the mobile user interface system implementing and ARINC 661 compliant display system, and executed on the CPU and/or GPU of the mobile user interface system. Recall, as described in conjunction with block 306, the mobile user interface system may provide an ARINC 661 display capability to the vehicle system when the mobile user interface system is detected on the vehicle system network. Based on this capability, the vehicle system may then start an ARINC 661 display system whereby the vehicle system sends display data to the mobile user interface system. Alternatively, in at least some embodiments in which a peripheral bus, such as a peripheral bus 124 or 126 comprises a video bus, such as DisplayPort bus promulgated by the Video Electronics Standards Association (VESA), Newark, Calif., or an ARINC-818 bus promulgated by ARINC-IA, the display data may be generated by the CPU in the vehicle system and communicated to the mobile user interface on the video bus.

Method 300 then proceeds to block 318, to collect mission operations data in block 318, and loops through blocks 322, 324 and 318 via the "No" branch of block 320 until breaking out of the loop via the "Yes" branch of block 320. In this way, a vehicle, such as an autonomous vehicle, may be configured to operate under human control in accordance with the at least some embodiments of the principles of the disclosure. For example, a vehicle may be capable of autonomously traveling to a fueling station to be refueled and returning to an operations area for deployment on a mission.

On breaking out of the loop via the "Yes" branch of block 320, the mission application software and/or data downloaded at block 308 is deleted, block 326. At block 328, method 300 may be configured to encrypt the mission operations data collected at block 318 prior to uploading that data to the mobile user interface system. For example, in an embodiment of a vehicle computer system in which encryption is implemented in software and hardware-based encryption is provided in the mobile system, encryption of the mission operations data might be deferred until the data is uploaded to the mobile user interface system. If method 300 is configured to encrypt the mission operations data prior to upload, then block 328 proceeds by the "Yes" branch and the mission operation data collected at block 318 is encrypted, in block 330.

An encryption engine such as encryption engine 207 may be used to encrypt the data in at least some embodiments. The mission operations data may be encrypted with a public key encryption system using a public encryption key associated with a secure data processing system located at a base mission planning facility, for example. Because the encryption key is a public key, it does not need to be stored securely and, in an embodiment of a vehicle computer system such as vehicle computer system 200, may be stored in RAM 206. The public key may, for example, be included in mission data downloaded in block 308. The mission data may be uploaded in encrypted form to the mobile user interface system, block 332.

Alternatively, method 300 may be configured to upload the mission operations data to the mobile user interface system in unencrypted form. In such an embodiment, method 300 proceeds by the "No" branch in block 328 and the mission operations data is uploaded to the mobile system in unencrypted form in block 332. If the data is unencrypted upon upload to the mobile system, method 300 proceeds by the "No" branch in block 334 and the mission operations data is encrypted at block 336. The data may be encrypted by an encryption engine in the mobile user interface system, e.g. encryption engine 116, FIG. 1. As before, a public key encryption system may be used in conjunction with a public key associated with a secure data processing system at, say, a base mission planning facility. The mission operations data may then be stored, at block 338, in encrypted form in, for example, the non-volatile RAM of the mobile system such as NVRAM 104, for later retrieval, as described below. Method 300 ends at block 340.

Returning now to block 314, if the user input authentication data fails to authenticate, block 314, method 300 proceeds by the "No" branch of block 314 to block 342. In block 342, the authentication error is reported to the user. To account for the possibility of read errors in a biosensor or other access control device, at block 344, a predetermined number, N, of retries are admitted. Although N may be any predetermined number, typically N would be small, say three for example, in at least some embodiments. However, any predetermined number may be used. If N retries have not been reached, block 344 falls through the "No" branch and returns to block 312 where user input authentication data is received. The user input authentication data is again authenticated, block 314. Method 300 then loops through blocks 314, 342, 344 and 312 until the user input authentication data either (i) authenticates at block 314, or (ii) the number of retries, N is exceeded, at block 344. If the number of retries is exceeded, then block 344 falls through the "Yes" branch, the vehicle system is locked, at block 348, and the user notified that the system is locked, at block 350. Method 300 ends at block 340.

It will be readily appreciated that although blocks 302-350 are depicted serially for ease of illustration, the actions therein are not necessarily performed serially, but may be performed substantially in parallel. For example, the reception and display of control information may be performed in parallel with the collection of mission operations data at blocks 322, 324 and 318. Other actions may also be performed in parallel.

Figure 4:
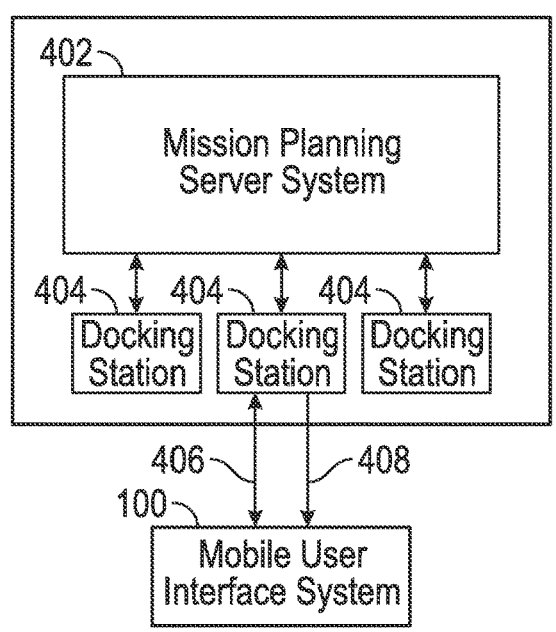
FIG. 4 shows a block diagram of an mission planning facility system in accordance with at least some embodiments.

Mission operations data may be retrieved from a mobile user interface system at a mission planning system. Such a mission planning system may be located at a base facility, for example. Referring now to FIG. 4, in at least some embodiments, a mission planning system 400 comprises an mission planning server system 402 having one or more docking stations 404 coupled thereto. A mission planning server system 402 may comprise a secure data processing system. A mobile user interface system 100 may be docked to a docking station 404 which provides a data input/output connection between system 100 and mission planning server system 402 via a peripheral network bus 406. Peripheral network bus 406 may, for example, comprise one or more of a PCIe bus, USB bus, IEEE 802.3 (Ethernet) bus or an IEEE 802.11 (wireless) link, both promulgated by the Institute of Electrical and Electronic Engineers (IEEE), Piscataway, N.J. Docking station 404 may also provide electrical power to mobile user interface system 100 via a power bus 408. In a post-mission process, mission planning server system 402 may retrieve mission operations data from mobile user interface system 100 for subsequent analysis.

Figure 5:
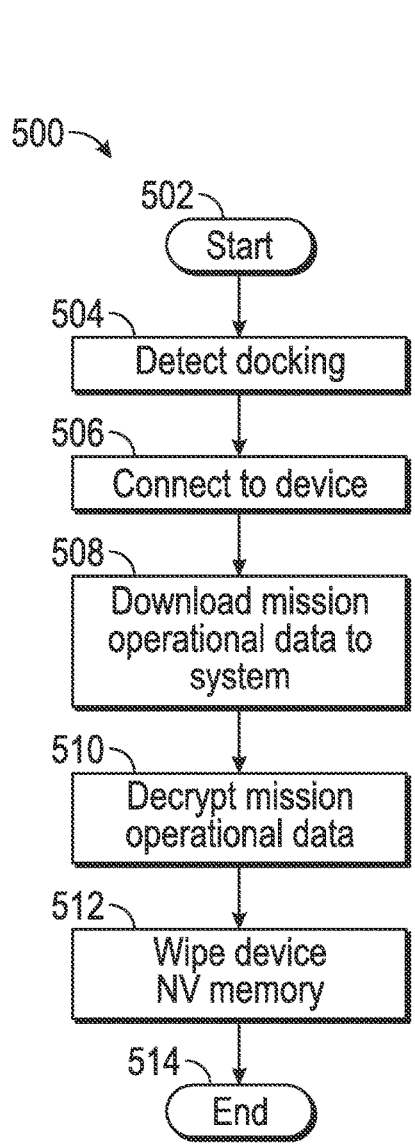
FIG. 5 shows flow chart of a method for retrieving mission information from a mobile user interface system in accordance with at least some embodiments.

A flowchart of a method 500 for retrieving mission operations data in accordance with at least some embodiments is shown in FIG. 5. Method 500 starts at block 502, and in block 504 docking of a mobile user interface system is detected. Analogous to block 310, FIG. 3, in block 506 the mobile user interface system is connected to a mission planning server system. The connection may be through a peripheral bus such as one of peripheral buses 124 and 126, FIG. 1. In block 508, the mission operations data is downloaded from the mobile user interface system. Such data may, as previously described, be in encrypted form, and in particular, encrypted with a public key system using the public key of a secure data processing system such as a mission planning server system 402. At block 510, encrypted mission operations data is decrypted. The decryption may use the private key associated with the public key of the secure data processing system. The private key may be stored on the secure data processing system, such as a mission planning server system 402. Although information is stored in the NVRAM of the mobile user interface system, as an added security measure, method 500 may "wipe", e.g. overwrite with all zeros, the non-volatile random access memory of the mobile user interface system at block 512. Method 500 ends at block 514.

Figure 6:
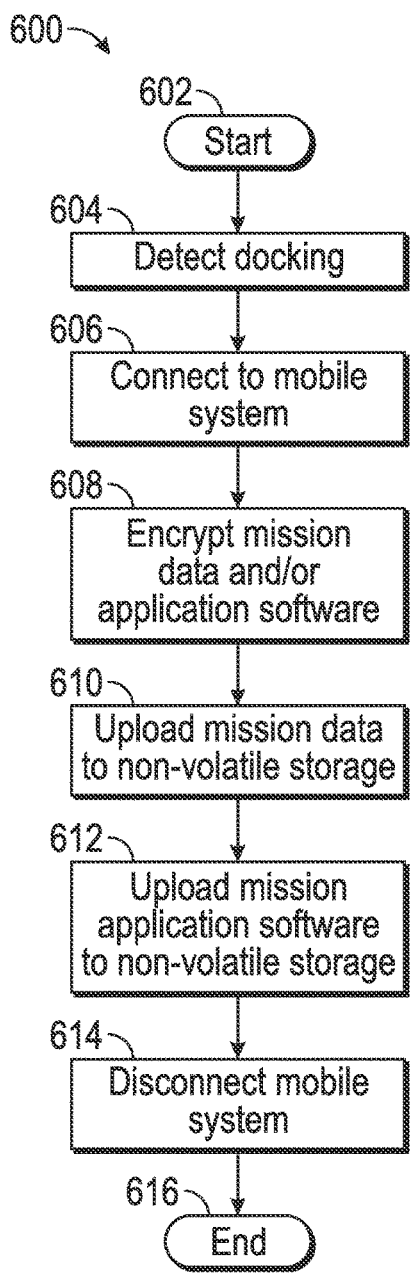
FIG. 6 shows a flow chart of a method for loading mission information in a mobile user interface system in accordance with at least some embodiments.

As described above, a mobile user interface system may be used to load mission data and/or application software into a vehicle computer system. The mission planning server system 402 may store such data and software and may be used to load the data and software into the mobile user interface system. Mission data may include a biosensor signature and/or other access control data, such as a user identifier and password, of the user assigned the mission. This access control data may be may be compared with user input authentication data, such as digitized biosensor data from a biosensor in the vehicle computer system as described above. A flowchart of a method 600 for loading mission data and/or application software is shown in FIG. 6.

Method 600 starts at block 602. In block 604, docking of a mobile user interface system is detected. The mobile user interface system is connected to the operations center server system in block 606. Analogous to block 506 in method 500, a connection may be effected through a peripheral bus in the mobile user interface system. The mission data and/or application software is encrypted at block 608. The encryption may, in at least some embodiments, use a public key encryption system and a public key associated with the particular vehicle where the mission data and/or application software will be deployed. As described above in conjunction with FIG. 3, the vehicle computer system may securely store in hardware the private key of the vehicle public-private key pair, obviating entry of the private key by methods that might be subject to compromise. In block 610, encrypted mission data is downloaded to the non-volatile random access memory in the mobile user interface system. Encrypted mission application software, if any, is downloaded to the non-volatile random access memory in the mobile user interface system in block 612. The mobile user interface system is disconnected from the operations center server system, block 614 and method 600 ends at block 616.

The above discussion is meant to be illustrative of the principles and various embodiments of the present invention. Numerous variations and modifications will become apparent to those skilled in the art once the above disclosure is fully appreciated. For example, a vehicle may employ multiple vehicle computer systems configured similarly, but not necessarily identically, to the exemplary system in FIG. 2. It is intended that the following claims be interpreted to embrace all such variations and modifications.

What is claimed is:

1. A system comprising:
   a first processor;

a non-volatile random access memory coupled to the first processor, the non-volatile random access memory storing program instructions for execution by the first processor, the programming instructions stored only in encrypted form;

an encryption engine coupled to the first processor and coupled to the non-volatile random access memory;

a bridge logic device coupled to the first processor and configured to couple to an external peripheral network bus; and wherein the encryption engine is configured to decrypt software program instructions stored in the non-volatile random access memory for execution by the first processor.

2. The system of claim 1 further comprising a display device coupled to at least one of a processor selected from the group consisting of:

the first processor and a graphics processor.

3. The system of claim 2 wherein the encrypted program instructions further comprise encrypted program instructions that when decrypted and when executed by at least one of the first processor and the graphics processor, implement an aviation industry standard compliant display system on the display device.

4. The system of claim 1 further comprising a biosensor interface coupled to the bridge logic device and configured to couple to an external biosensor.

5. The system of claim 4 wherein the external biosensor comprises a retinal scan device.

6. The system of claim 4 wherein the external biosensor comprises a fingerprint scan device.

7. The system of claim 1 wherein the encryption engine comprises a public key encryption system.

8. The system of claim 7 wherein the encrypted program instructions are encrypted using the public key encryption system with a public key associated with the system, and the encryption engine further comprises a private key paired with the public key associated with the system.

9. The system of claim 1 wherein the programming instructions comprise programming instructions that when executed by the first processor, cause the system to:

receive mission control data from a vehicle computer system coupled to the external peripheral network bus; and display the mission control data on a display device of the system.

10. The system of claim 9 wherein the programming instructions further comprise instructions that when executed by the first processor cause the system to download mission data from the system to the vehicle computer system.

11. The system of claim 9 wherein the programming instructions further comprise instructions that when executed by the first processor cause the system to upload mission operations data collected by the vehicle computer system, the mission operations data generated by one or more vehicle I/O sensors coupled to the vehicle computer system.

12. The system of claim 11 wherein the missions operation data is stored in the system non-volatile random access memory.

* * * * *